United States Patent
Frost et al.

(10) Patent No.: US 11,062,049 B2
(45) Date of Patent: Jul. 13, 2021

(54) CONCEALMENT OF CUSTOMER SENSITIVE DATA IN VIRTUAL COMPUTING ARRANGEMENTS

(71) Applicant: Citrix Systems, Inc., Fort Lauderdale, FL (US)

(72) Inventors: Simon Frost, Herts (GB); William Charnell, Bucks (GB)

(73) Assignee: Citrix Systems, Inc., Fort Fauderdale, FL (US)

( * ) Notice: Subject to any disclaimer, the term of this patent is extended or adjusted under 35 U.S.C. 154(b) by 398 days.

(21) Appl. No.: 15/966,068

(22) Filed: Apr. 30, 2018

(65) Prior Publication Data

US 2019/0332798 A1    Oct. 31, 2019

(51) Int. Cl.
  *G06F 21/62* (2013.01)
  *H04L 9/32* (2006.01)
  *H04L 9/30* (2006.01)

(52) U.S. Cl.
  CPC ............ *G06F 21/6245* (2013.01); *H04L 9/30* (2013.01); *H04L 9/3242* (2013.01)

(58) Field of Classification Search
  CPC ............ G06F 21/6209; G06F 21/6245; H04L 63/0428; H04L 63/0435; H04L 63/0442; H04L 63/06; H04L 9/30; H04L 9/3239; H04L 9/3242
  See application file for complete search history.

(56) References Cited

U.S. PATENT DOCUMENTS

| 9,292,699 | B1* | 3/2016 | Stuntebeck | H04L 9/14 |
| 2011/0264907 | A1* | 10/2011 | Betz | H04L 63/0428 713/153 |
| 2014/0258719 | A1 | 9/2014 | Cidon et al. | |
| 2017/0076105 | A1 | 3/2017 | Paulovicks et al. | |
| 2017/0264619 | A1* | 9/2017 | Narayanaswamy | G06F 21/6209 |
| 2018/0232526 | A1* | 8/2018 | Reid | H04L 9/3271 |

OTHER PUBLICATIONS

"ShareFile Enterprise" Citrix Systems, Inc. www.citrix.com, copyright 2015, pp. 1-8.
Sep. 3, 2020—U.S. Non-final Office Action—U.S. Appl. No. 16/121,743.
Mar. 17, 2021—U.S. Notice of Allowance—U.S. Appl. No. 16/121,743.

* cited by examiner

*Primary Examiner* — Minh Dinh
(74) *Attorney, Agent, or Firm* — Banner & Witcoff, Ltd.

(57) ABSTRACT

Aspects described herein are directed to the concealment of customer sensitive data in virtual computing arrangements. A local computing platform may receive an object including a customer sensitive object name from a user computing device operating on a same internal domain as the local computing platform. The local computing platform may conceal the customer sensitive object name from a virtual computing platform operating on a domain external from the internal domain. The local computing platform may provide the concealed object name to the virtual computing platform for facilitating object enumeration requests from the user computing device during virtual computing sessions. During a virtual computing session between the user computing device and virtual computing platform, the local computing platform may receive the concealed object name from the user computing device and may perform one or more operations to reveal the object name to the user computing device.

18 Claims, 12 Drawing Sheets

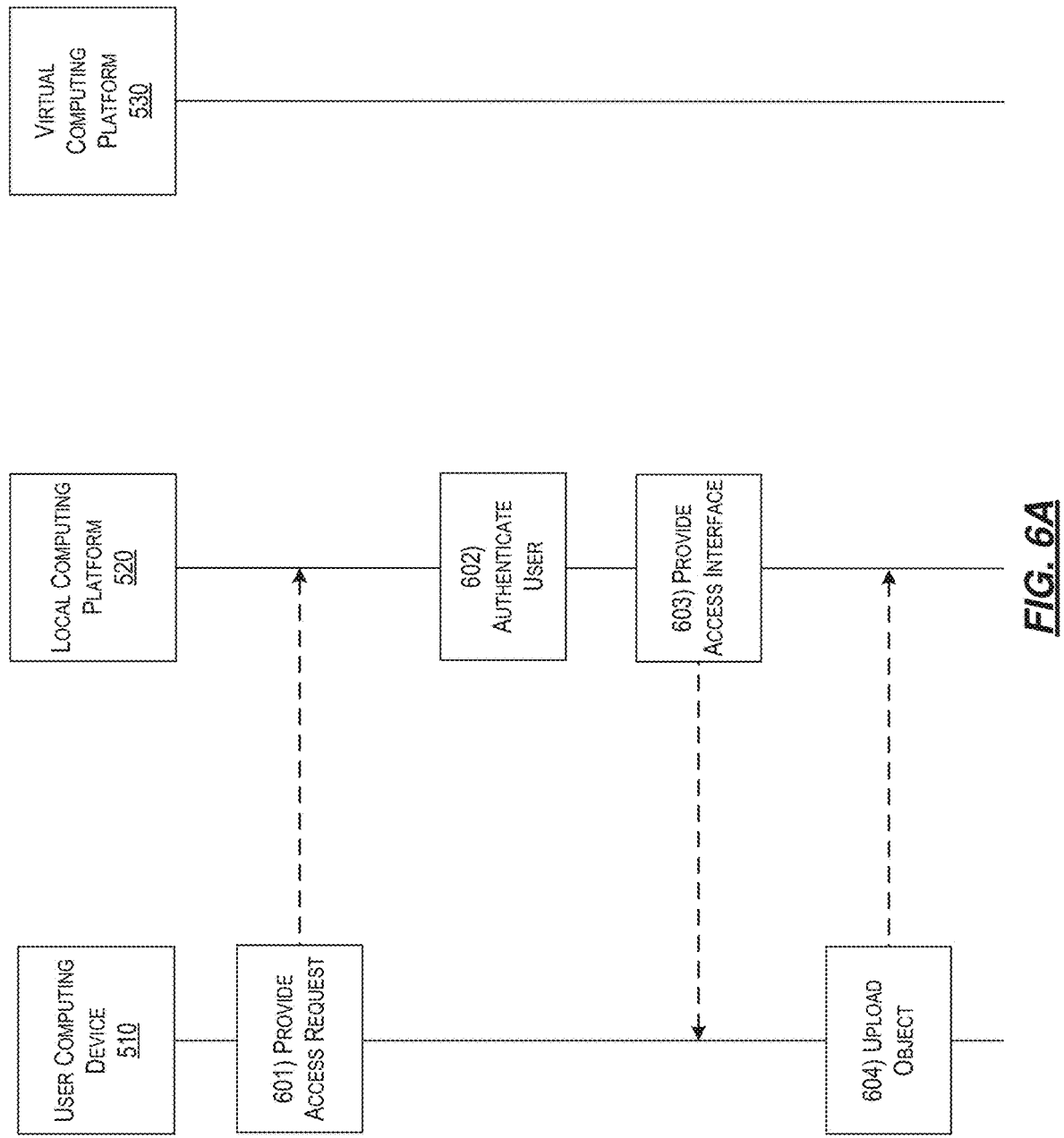

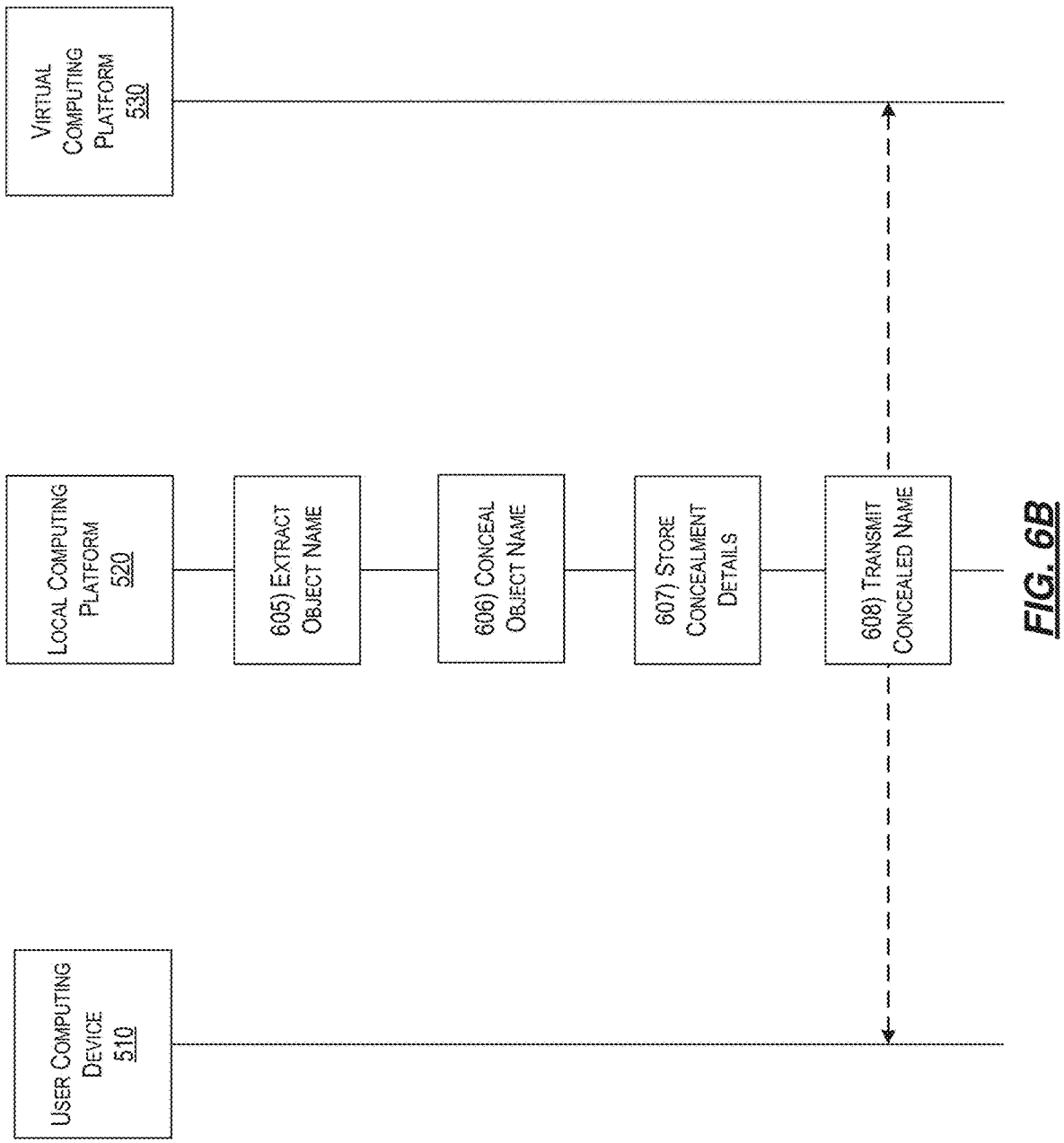

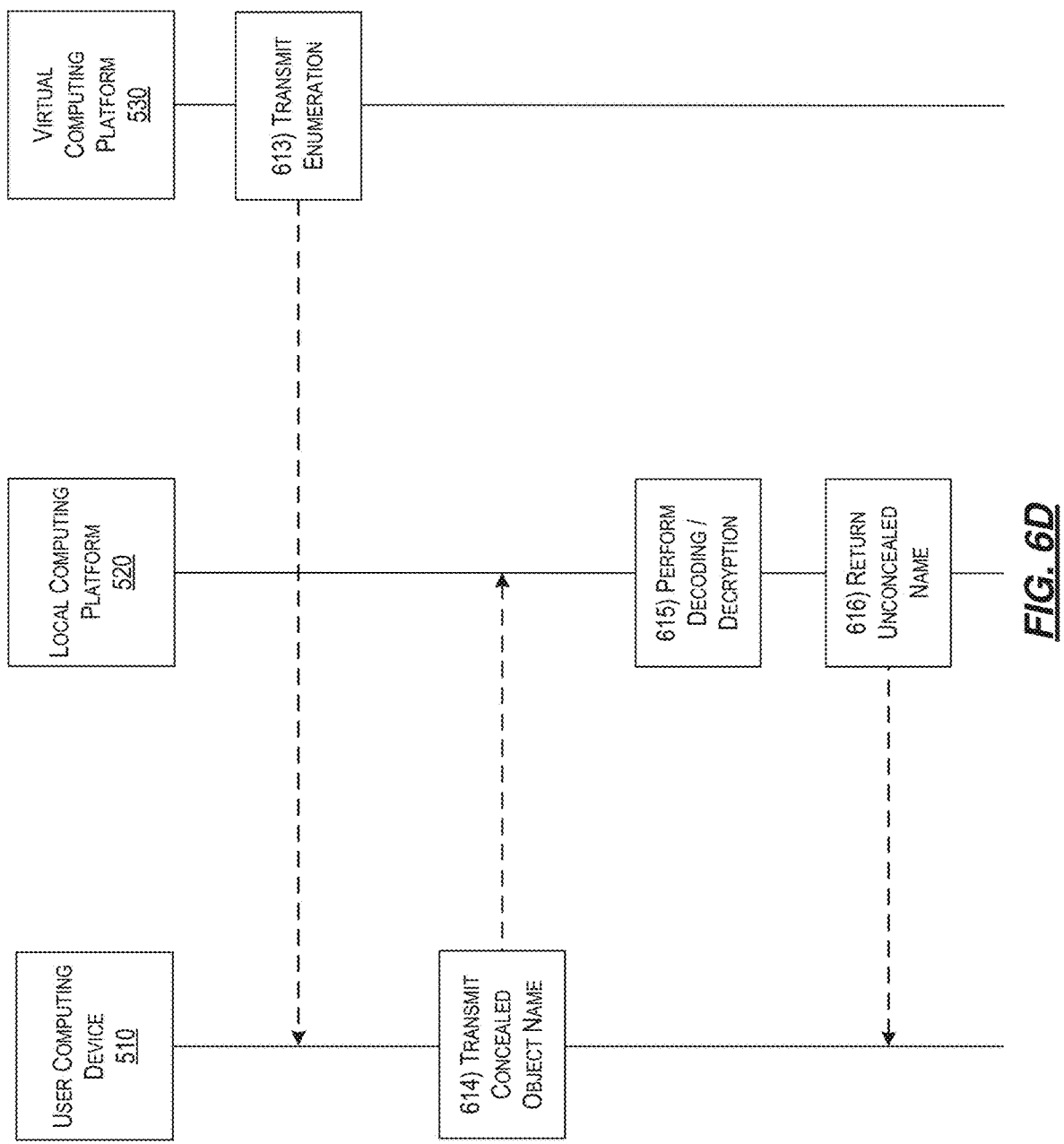

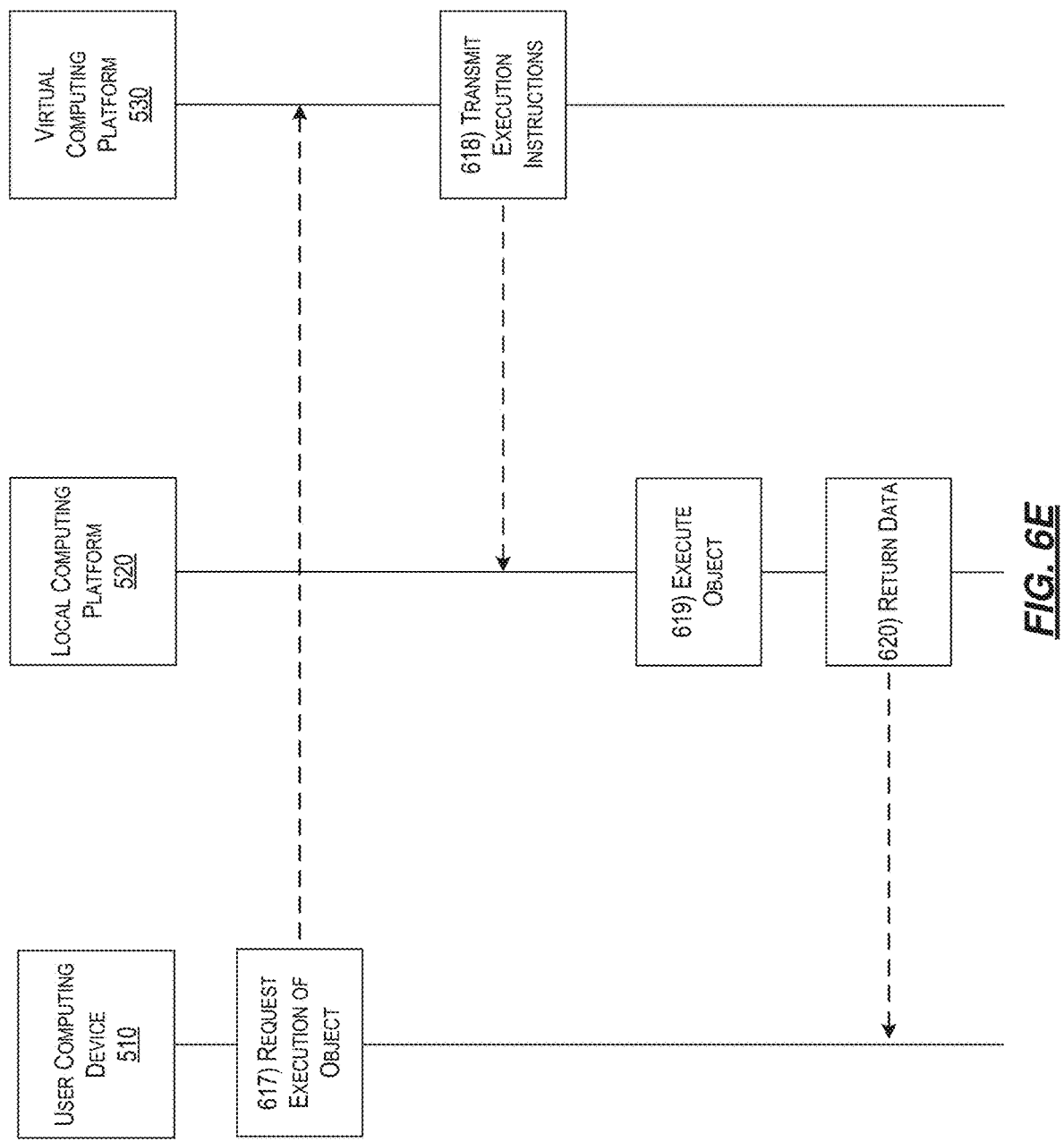

CONCEALMENT OF CUSTOMER SENSITIVE DATA IN VIRTUAL COMPUTING ARRANGEMENTS

FIELD

Aspects described herein generally relate to data security in virtual computing arrangements. More specifically, aspects described herein relate to protecting sensitive customer data in virtual computing arrangements.

BACKGROUND

Some customers may be nervous about transitioning to a virtual computing environment due to concerns, or compliance obligations, regarding the exposure of sensitive information outside their enterprise. Even with virtual computing arrangements which split execution of operations between a customer premises environment and an external virtual control plane, some information, such as application and/or object names, which customers may deem to be sensitive may be exposed to the virtual control plane. The disclosure of application and/or object names in the virtual control plane may prevent customers from using a virtual computing service or cause administrative overhead in manually reviewing entered information to ensure that sensitive information is not provided to an external third-party. Accordingly, there remains an ever-present need to improve security of customer sensitive data in virtual computing arrangements.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards apparatuses, systems, and methods for the hashing and/or encryption of customer sensitive data in virtual computing arrangements.

In accordance with one or more embodiments, a computing platform may receive an object including an object name from a user computing device sharing a same first domain as the computing platform. The computing platform may extract the object name associated with the object. The computing platform may conceal the object name to create a concealed object name identifying the object for presentation on a virtual computing platform operating on a second domain external from the first domain and may transmit the concealed object name to the virtual computing platform.

In some embodiments, responsive to an enumeration request provided by the user computing device to the virtual computing platform, the computing platform may receive the concealed object name during a virtual computing instance between the user computing device and the virtual computing platform. The computing platform may process the concealed object name to reveal the object name of the object and provide the object name to the user computing device.

In some embodiments, prior to receiving the object from the user computing device, the computing platform may receive an access request from the user computing device. Based on the access request, the computing platform may authenticate a user of the user computing device.

In some embodiments, the concealing of the object name by the computing platform may involve the usage of an encryption key.

In some embodiments, responsive to concealing the object name, the computing platform may transmit the encryption key to the user computing device.

In some embodiments, the concealing of the object name by the computing platform may involve the usage of one or more hashing operations.

In some embodiments, the computing platform may receive, from the user computing device, a plurality of objects each associated with unique object names, wherein at least one of the plurality of objects is identified as being a secure object. Based on identification of the secure object, the computing platform may conceal the unique object name of the secure object to create a concealed object name identifying the secure object.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 6A-6E depict an illustrative event sequence for the concealment of customer sensitive data in virtual computing arrangements in accordance with one or more illustrative aspects described herein.

DETAILED DESCRIPTION

Figure 1:
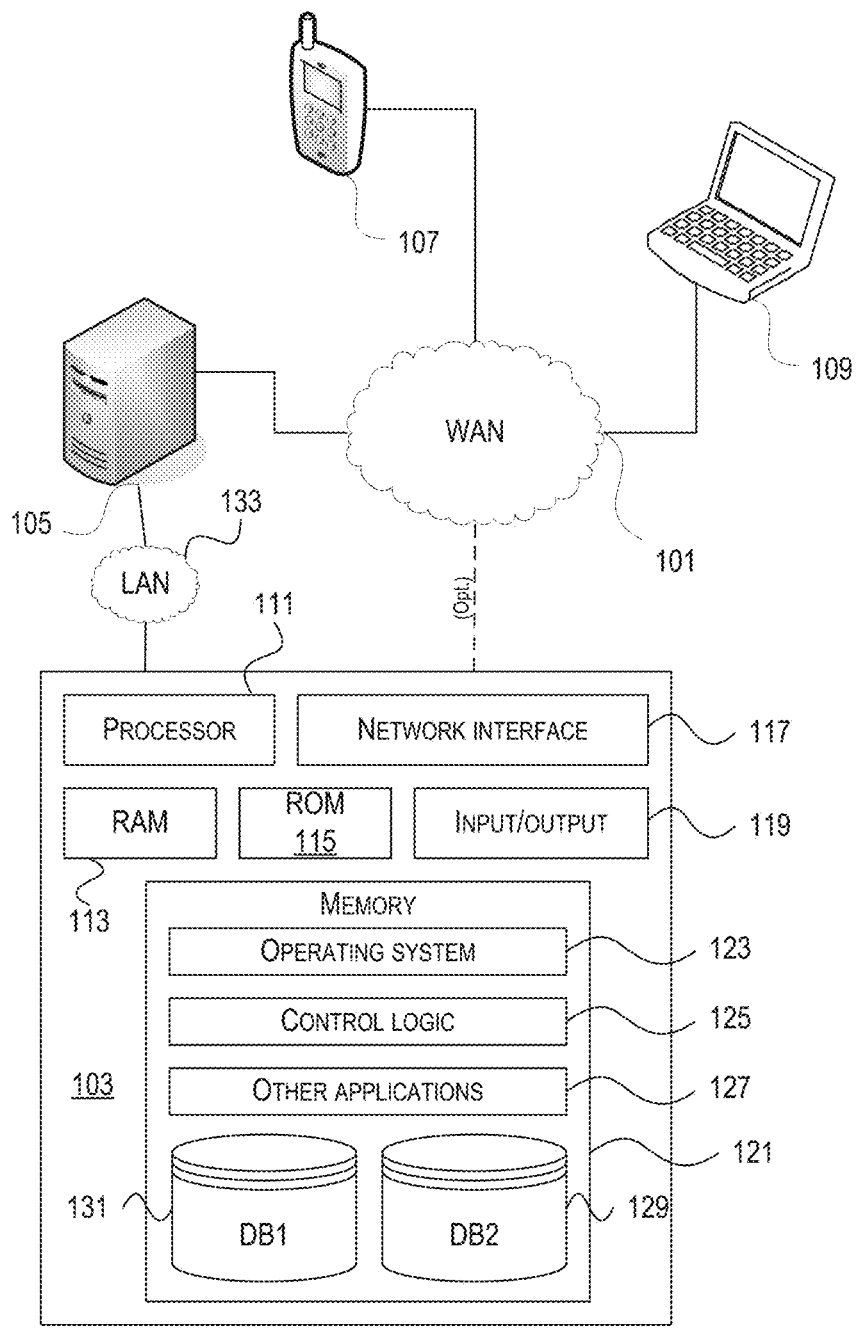
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards the hashing and/or encryption of customer sensitive data in virtual computing arrangements. A local computing platform may receive an object associated with an object name from a user computing device. In some instances, the object may be an application associated with a customer sensitive application name that a user of the user computing device wishes to hash and/or encrypt before being provided to a virtual computing platform and used in virtual computing sessions. The local computing platform may extract the object name associated with the object and may hash and/or encrypt the object name through execution of one or more hashing and/or encryption methods. After the hashed and/or encrypted name of the object has be returned from the one or more hashing and/or encryption methods, the local computing platform may transmit the hashed and/or encrypted name to the user computing device, as well as the virtual computing platform in an object creation call to the virtual computing platform.

Subsequently, the user computing device may commence a virtual computing session with the virtual computing platform. In enumerating objects with calls to the virtual computing platform, the hashed and/or encrypted name of the object may be returned to the user computing device by the virtual computing platform. In some instances, the user computing device may provide the hashed and/or encrypted object name to the local computing platform for decoding and/or decryption and the local computing platform may return the decoded and/or decrypted name of the object to the user computing device for display. Through implementation of the hashing and/or encryption processes, customer sensitive object names may be concealed from presentation to administrators of the virtual computing platform and data security concerns and/or compliance obligations regarding the exposure of sensitive information outside an enterprise may be addressed.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
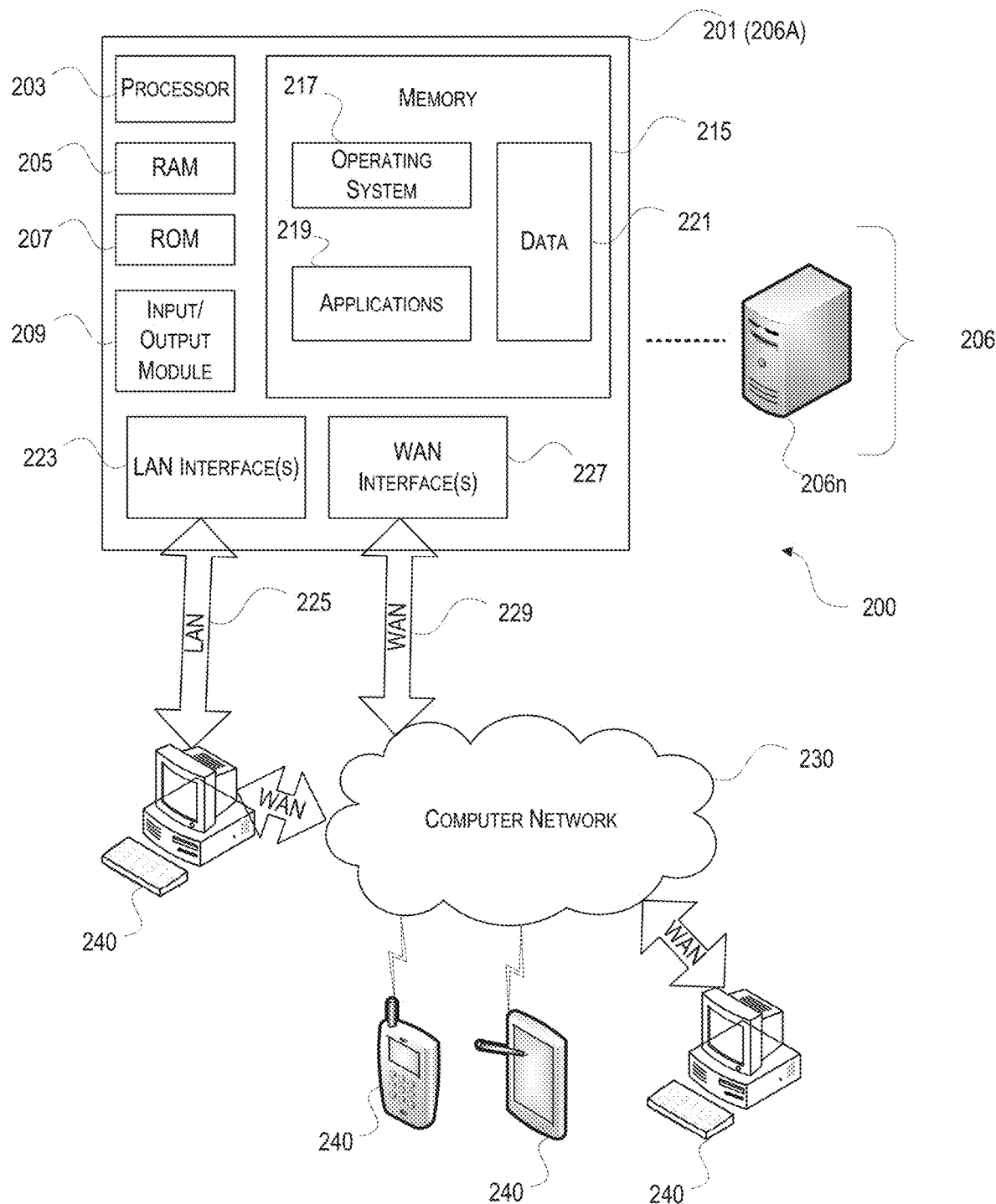
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) configured to provide virtual machines for client access devices. The computing device 201 may have a processor 203 for controlling overall operation of the server and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
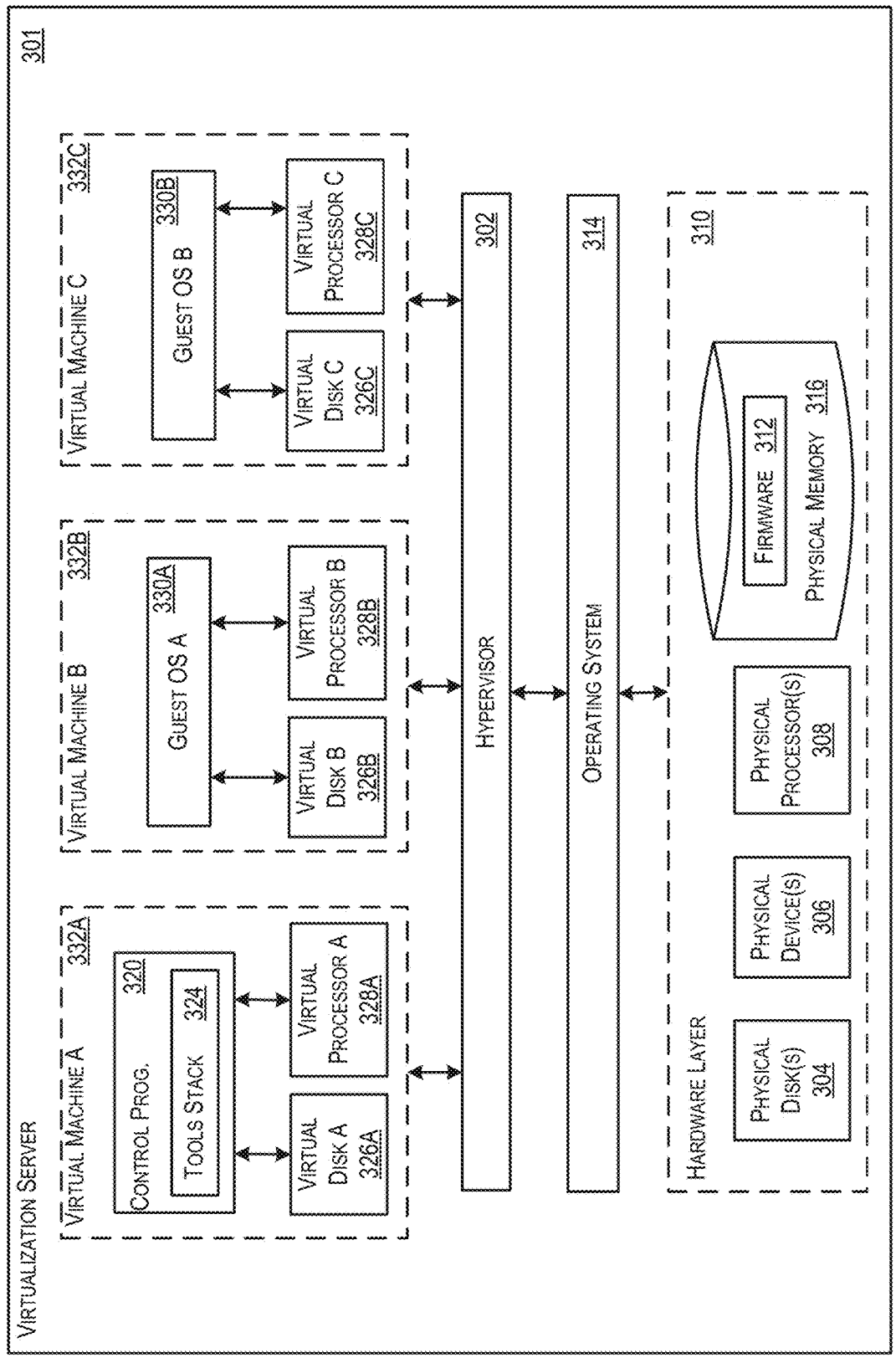
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
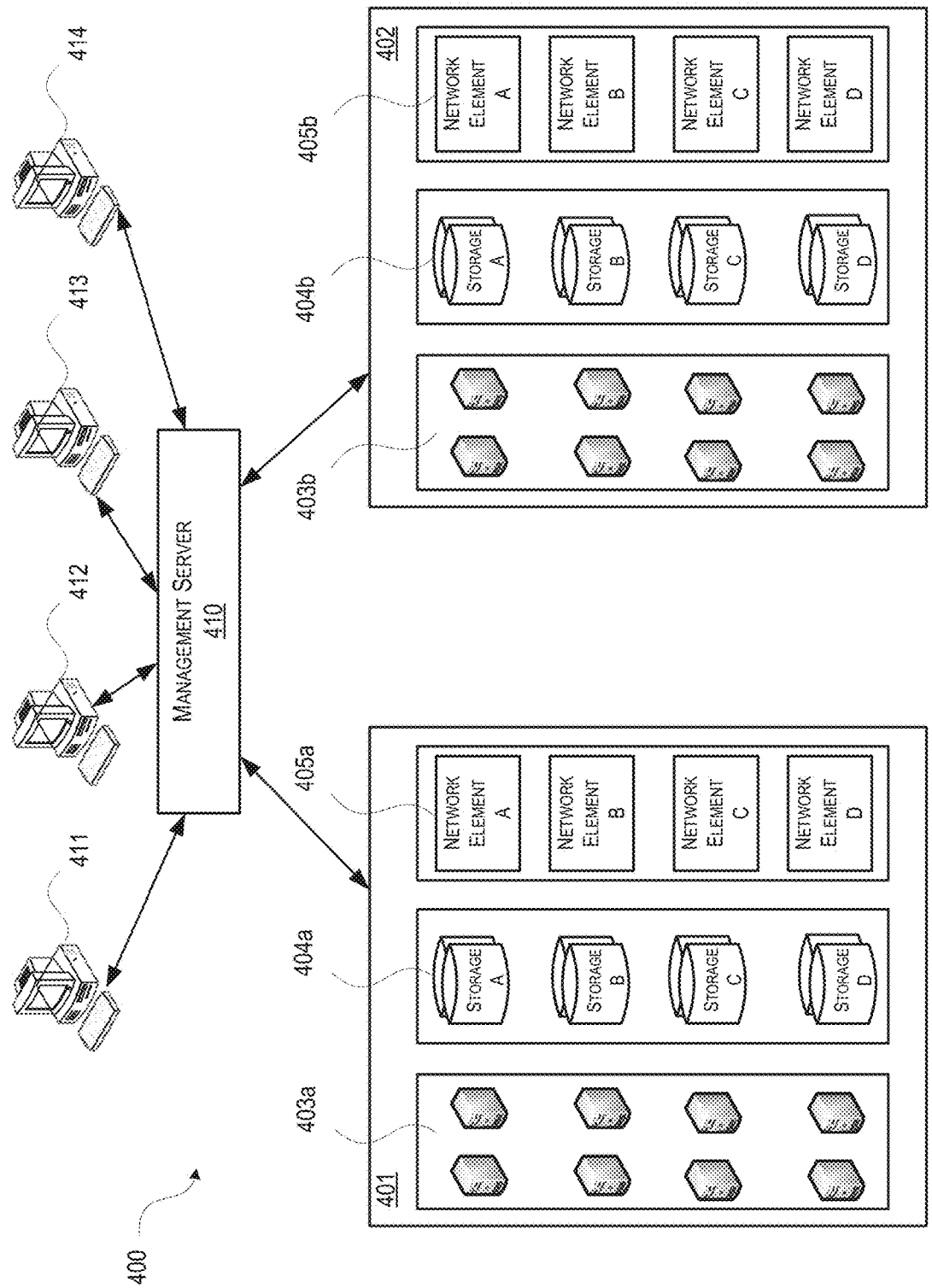
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network resources 405a-405b (generally referred herein as "network resources 405")) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Concealment of Customer Sensitive Data in Virtual Computing Arrangements

Figure 5A:
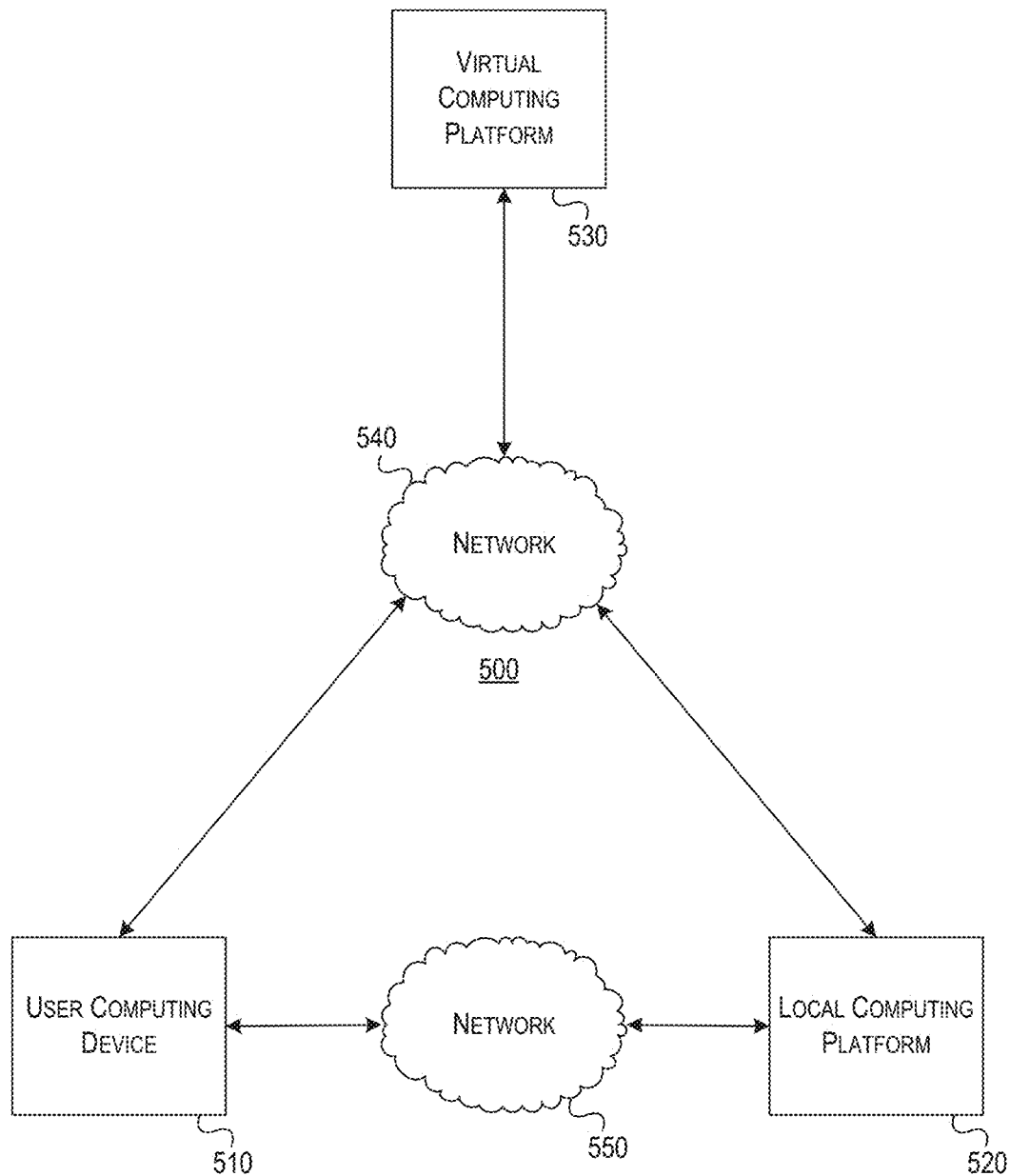
FIG. 5A depicts an illustrative diagram of a system for the concealment of customer sensitive data in virtual computing arrangements in accordance with one or more illustrative aspects described herein.

FIG. 5A depicts an illustrative diagram of a system for the concealment of customer sensitive data in virtual computing arrangements in accordance with one or more illustrative aspects described herein. As shown in FIG. 5A, computing system 500 may at least user computing device 510, local computing platform 520, and virtual computing platform 530. In some instances, user computing device 510, local computing platform 520, and virtual computing platform 530 may be configured to communicate with each other through one or more computer networks. For example, user computing device 510, local computing platform 520, and virtual computing platform 30 may be configured to communicate with each other through network 540, which may be a public network. Furthermore, user computing device 510 and local computing platform 520 may be configured to communicate with each other through network 550, which may be a private network. In some instances, additional computing devices and/or networks similar to user computing device 510, local computing platform 520, virtual computing platform 530, network 540, and network 550 may be included in computing system 500. According to the embodiment depicted in FIG. 5A, user computing device 510, local computing platform 520, and virtual computing platform 530 may participate in the encryption of customer sensitive data in virtual computing arrangements in accordance with one or more illustrative aspects described herein.

User computing device 510 may be any one of a personal computer, server computer, hand-held or laptop device, multiprocessor system, microprocessor-based system, set top box, programmable consumer electronic device, network personal computer (PC), minicomputer, mainframe computer, distributed computing environment, and the like, and may include any of the above systems or devices described in FIGS. 1-4. User computing device 510 may be configured to interact with local computing platform 520 by way of communications through network 550 and virtual computing platform 530 by way of communications through network 540. In particular, user computing device 510 may be configured to receive and transmit information in the hashing and/or encryption of customer sensitive data in virtual computing arrangements with local computing platform 520 and virtual computing platform 530, as will be described in further detail below.

In order to communicate with local computing platform 520, user computing device 510 may access one or more of a local directory and/or URL configured to provide access to local computing platform 520. Upon access, user computing device 510 may be configured to provide information to local computing platform 520 such as an object. As stated above, the object may include an object name which may be customer sensitive. In some instances, the object may be an application and the object name may correspond to a name of the application. Additionally and/or alternatively, user computing device 510 may also be configured to provide a hashed and/or encrypted object name to local computing platform 520 for decoding and/or decryption.

In order to communicate with virtual computing platform 530, user computing device 510 may access one or more of an application and/or URL configured to provide access to virtual computing platform 530. Upon access, user computing device 510 may be configured to request and/or access a virtual computing session provided by virtual computing platform 530. In engaging in the virtual computing session with virtual computing platform 530, user computing device 510 may be configured to request enumeration of available objects, applications, and/or programs available for operation by user computing device 510 during the virtual computing session. User computing device 510 may receive a listing and/or enumeration of objects, applications, and/or programs available during the virtual computing session from virtual computing platform 530. In some instances, the listing and/or enumeration may include names of available objects, applications, and/or programs in a hashed and/or encrypted state, decoded and/or decrypted state, and/or combination thereof.

Computing system 500 may further include local computing platform 520, which may be one or more of personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), and the like, and may include any of the above systems or devices described in FIGS. 1-4. Local computing platform may include a plurality of computing devices and associated computing hardware and software that may host various applications and/or databases configured to receive, transmit, and/or store data, control and/or direct actions of other devices and/or computer systems, and/or perform other functions, as discussed in greater detail below. In some arrangements, local computing platform 520 may include and/or be part of enterprise information technology infrastructure and may host a plurality of enterprise applications, enterprise databases, and/or other enterprise resources. Such applications may, for instance, be executed on one or more computing devices included in local computing platform 520 using distributed computing technology and/or the like. In some instances, local computing platform 520 may include a relatively large number of servers that may support operations of a particular enterprise or organization.

In addition, and as discussed in greater detail below, local computing platform 520 may be configured to communicate with user computing device 510 and virtual computing platform 530. In particular, local computing platform 520 may be configured to receive objects from user computing device 510 through network 550. Responsive to receiving the objects, local computing platform 520 may be configured to extract names associated with the objects and hash and/or encrypt the object names through execution of one or more hashing and/or encryption methods. Local computing platform 520 may be configured to return the hashed and/or encrypted object names to user computing device 510 through network 550 and/or to transmit the hashed and/or encrypted object names to virtual computing platform 530 through network 540. In the event that user computing 510 engages in a virtual computing session with virtual computing platform 530 and receives the hashed and/or encrypted object names from virtual computing platform 530, local computing platform 520 may be configured to decode and/or decrypt the encrypted object names through referencing hash mapping information and/or execution of one or more decryption methods responsive to requests provided by user computing device 510.

In some instances, user computing device 510 and local computing platform 520 may configured to communicate through network 550 which may be a local and/or private network. Additionally, network 550, through which user computing device 510 and local computing platform 520 communicate, may be associated with a local and/or internal domain which maps computing resources available to each of user computing device 510 and local computing platform 520. The local domain (e.g., first domain) may be shared by each of user computing device 510 and local computing platform 520.

Computing system 500 may also include virtual computing platform 530, which may be one or more of personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), and the like, and may include any of the above systems or devices described in FIGS. 1-4. Virtual computing platform 530 may include a plurality of computing devices and associated computing hardware and software that may host various applications and/or databases configured to receive, transmit, and/or store data, control and/or direct actions of other devices and/or computer systems (e.g., user computing device 510), and/or perform other functions, as discussed in greater detail below. In some arrangements, virtual computing platform 530 may include and/or be part of enterprise information technology infrastructure and may host a plurality of enterprise applications, enterprise databases, and/or other enterprise resources. Such applications may, for instance, be executed on one or more computing devices included in virtual computing platform 530 using distributed computing technology and/or the like. In some instances, virtual computing platform 530 may include a relatively large number of servers that may support operations of a particular enterprise or organization, such as a cloud computing provider.

As discussed above, virtual computing platform 530 may be configured to interface with an application operating on user computing device 510 and/or provide a URL through which user computing devices 510 may access virtual computing platform 530. Virtual computing platform 530 may be configured to provide a virtual computing session to user computing device 510. In providing virtual computing sessions to user computing device 510, virtual computing platform 530 may be configured to receive object enumeration requests from user computing device 510 and to provide a listing and/or enumeration of objects available to user computing device 510 in a virtual computing session. In some instances, the provided listing and/or enumeration may include names of objects in a hashed and/or encrypted form, decoded and/or decrypted form, or combination thereof.

In some instances, virtual computing platform 530 may be configured to communicate with user computing device 510 and local computing platform 520 through network 540 which may be an external and/or public network. In addition to being configured to communicate through network 540, virtual computing platform 530 may be further configured to communicate through a local and/or private network, different than network 540 and network 550, which interlinks the totality of computing devices and resources comprising virtual computing platform 530. In some instances, the local and/or private network interlinking the various computing devices of virtual computing platform 530 may be associated with a local and/or internal domain which maps computing resources available to virtual computing platform 530. The domain (e.g., second domain) associated with virtual computing platform 530 may be considered an external domain relative to the internal domain related to user computing device 510 and local computing platform 520 and may be shared by each of computing devices comprising virtual computing platform 530.

Returning to FIG. 5A, computing system 500 also may include one or more networks, which may interconnect one or more of the one or more user computing device 510, local computing platform 520, and virtual computing platform 530. For example, computing system 500 may include network 540 and network 550. Network 540 may include one or more sub-networks (e.g., local area networks (LANs), wide area networks (WANs), or the like). In some instances, network 540 may be a public and/or external network through which user computing device 510, local computing platform 520, and virtual computing platform 530 are configured to communicate and operate. Network 550 may also include one or more sub-networks (e.g., local area networks (LANs), wide area networks (WANs), or the like). In some instances, network 550 may be a private and/or internal network through which user computing device 510 and local computing platform 520 are configured to communicate and operate. Accordingly, user computing device 510, local computing platform 520, and network 550 may be associated with a similar entity, organization, and/or enterprise.

Figure 5B:
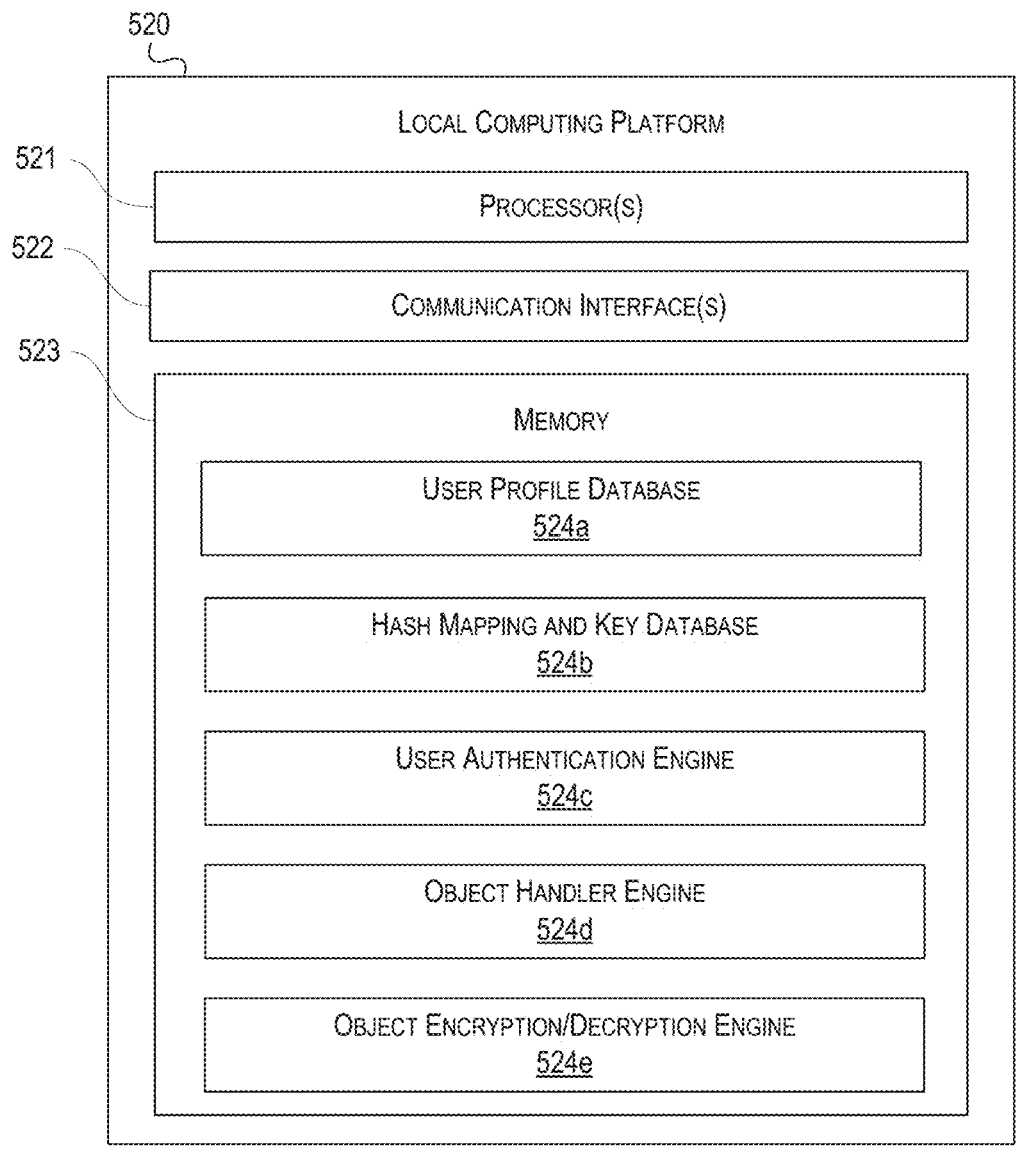
FIG. 5B depicts an illustrative diagram of a computing device for the concealment of customer sensitive data in virtual computing arrangements in accordance with one or more illustrative aspects described herein.

FIG. 5B depicts an illustrative diagram of local computing platform 520 for the concealment of customer sensitive data in virtual computing arrangements in accordance with one or more illustrative aspects described herein. Local computing platform 520 may include processor(s) 521, communication interface(s) 522, and memory 523. Communication interface(s) 522 may include wired network adapters, wireless network adapters, and/or other networks interfaces configured to support communication between local computing platform 520 and one or more networks (e.g., network 540 and network 550). Memory 523 may include one or more program modules having instructions that, when executed by processor(s) 521, cause local computing platform 520 to perform processes related to the hashing and/or encryption of customer sensitive data, as well as other functions described herein. For example, memory 523 may have, store, and/or include user profile database 524a, hash mapping and key database 524b, user authentication engine 524c, object handler engine 524d, and object encryption/decryption engine 524e. In some instances, memory 523 may further serve as a shared memory which may be mutually and/or commonly accessible by each of user profile database 524a, hash mapping and key database 524b, user authentication engine 524c, object handler engine 524d, and object encryption/decryption engine 524e in performing the functions as described herein.

User profile database 524a may store information corresponding to a user and/or system administrator of user computing device 510 as pertaining the usage of local computing platform 520. In particular, user profile database 524a may store data corresponding to user and/or system administrator credentials (e.g., usernames and passwords) and preferences in regard to the manner in which user authentication engine 524c, object handler engine 524d, and/or object encryption/decryption engine 524e perform their respective functions relative to particular users and/or system administrators. In some instances, user profile database 524a may further store information related to access permissions for local computing platform 520 corresponding to user and/or system administrator credentials.

Hash mapping and key database 524b may store information corresponding to hash mappings and/or public/private key pairs used to conceal customer sensitive object data. In particular, hash mapping and key database 524b may store mapping information which associates a customer sensitive object name with a corresponding hash of the customer sensitive object name for the purposes of decoding the name upon request by user computing device 510 and/or virtual computing platform 530. Additionally, hash mapping and key database 524b may store public/private key pairs used to encrypt and decrypt a customer sensitive object name responsive to a request by user computing device 510 and/or virtual computing platform 530.

User authentication engine 524c may have instructions that facilitate the authentication of a user and/or system administrator of user computing device 510 prior to allowing access to local computing platform 520 and performance of the customer sensitive object name concealment processes described herein. For instance, user authentication engine 524c may enable local computing platform 520 to receive login information (e.g., username and password) associated with a user and/or system administrator from user computing device 510. User authentication engine 524c may store further instructions which cause local computing platform 520 to corroborate the username and password provided by user computing device 510 with username and password information stored in user profile database 524a. Further, user authentication engine 524c may store instructions which cause local computing platform 520 to assess whether or not a user and/or system administrator, based on provided credentials, is able to request performance of certain processes provided by local computing platform 520 in the concealment of customer sensitive data in virtual computing arrangements.

Object handler engine 524d may store instructions which cause local computing platform 520 to provide user computing device 510 with an access interface to upload objects responsive to corroboration of the username and password provided by user computing device 510. Through the access interface, a user and/or system administrator may use user computing device 510 to provide objects including customer sensitive object names to local computing platform 520 for concealment (e.g., hashing and/or encryption). Additionally, the access interface may enable a user and/or system administrator of user computing device 510 to specify an encryption and/or security level related to the customer sensitive object name Object handler engine 524d may store further instructions which cause local computing platform 520 to receive objects from user computing device 510 through the access interface and provide the customer sensitive object names corresponding to the objects to object encryption/decryption engine 524e for processing. Additionally, object handler engine 524d may cause local computing platform 520 to extract object names comprising customer sensitive data from the objects provided by user computing device 510. Object handler engine 524d may store further instructions which cause local computing platform 520 to receive hashed and/or encrypted object names from user computing device 510 and/or virtual computing platform 530.

Object encryption/decryption engine 524e may store instructions which cause local computing platform 520 to hash and/or encrypt customer sensitive object names provided by user computing device 510. In particular, object encryption/decryption engine 524e may cause local computing platform 520 to execute one or more hashing functions such as BLAKE (e.g., BLAKE-256, BLAKE-512, and the like), MD (e.g., MD2, MD4, MD5, and the like), Scrypt, SHA (e.g., SHA-1, SHA-256, SHA-512, and the like), Skein, Spectral Hash, SWIFT, Tiger, and so on to hash customer sensitive object names provided by user computing device 510. Additionally and/or alternatively, object encryption/decryption engine 524e may cause local computing platform 520 to utilize one or more private/public key pairs and/or algorithms such as public key infrastructure (PKI), Rivest-Shamir-Adleman signature schemes (e.g., RSA), digital signature algorithm (e.g., DSA), Edwards-curve digital signature algorithm, and the like to encrypt the customer sensitive object name In some instances, other encryption methods and/or algorithms such as Triple DES, blowfish, twofish, and/or AES may be used in encrypting the customer sensitive object names.

Object encryption/decryption engine 524e may be configured to cause local computing platform 520 to perform certain hashing and/or encryption processes depending on an encryption and/or security level provided by a user and/or system administrator. For example, if a user and/or system administrator specifies that a customer sensitive object name requires a high level of security, object encryption/decryption engine 524e may cause local computing platform 520 to execute one or more stringent hashing algorithms and/or methods, and/or one or more encryption algorithms and/or methods. Conversely, if a user and/or system administrator specifies that a customer sensitive object name requires a low level of security, object encryption/decryption engine 524e may cause local computing platform 520 to execute one or more basic hashing algorithms and/or methods, and/or one or more encryption algorithms and/or methods.

Additionally, object encryption/decryption engine 524e may store instructions which cause local computing platform 520 to decode and/or decrypt customer sensitive object names provided by user computing device 510 and/or virtual computing platform 530. In particular, object encryption/decryption engine 524e may cause local computing platform 520 to execute one or more decryption methods corresponding to the private/public key pairs used to encrypt the customer sensitive object name. Furthermore, object encryption/decryption engine 524e may store further instructions which cause local computing platform 520 to access hash mappings of customer sensitive object names and resultant hashes of the customer sensitive object names in hash mapping and key database 524b to decode hashes of the customer sensitive object names.

FIGS. 6A-6E depict an illustrative event sequence for the concealment of customer sensitive data in virtual computing arrangements in accordance with one or more illustrative aspects described herein. While the steps of the event sequence of FIGS. 6A-6E are described in a particular order, it should be understood that the steps may be performed in any order without departing from the scope of the disclosure provided herein. Furthermore, even though the event sequence is described as being performed by a particular arrangement of computing devices (e.g., user computing device 510, local computing platform 520, and virtual computing platform 530) the processes may be performed by a number of computing devices greater or less than those described in regard to FIGS. 6A-6E. For example, additional user computing devices 510, local computing platforms 520, virtual computing platforms 530, and other computing devices may be used in the hashing and/or encryption of customer sensitive data in virtual computing arrangements without departing from the scope of the disclosure provided herein.

Referring to FIG. 6A, at step 601, a user and/or system administrator of user computing device 510 may provide an access request to local computing platform 520. In some instances, the access request may include a username and password of the user and/or system administrator of user computing device 510. In other instances, however, the user and/or system administrator may be authenticated upon logging into user computing device 510 and/or accessing private network 550 and login details may not need to be provided to local computing platform 520. In some instances, other users of other user computing devices related to private network 550 and local computing platform 520 may provide an access request to local computing platform 520.

At step 602, local computing platform 520 may authenticate the username and password provided by user computing device 510 at step 601. In doing so, processors 521 of local computing platform 520 may execute one or more instructions of user authentication engine 524c which may cause local computing platform 520 to corroborate the username and password provided by user computing device 510 against previously registered usernames and passwords stored in user profile database 524a. In instances in which the user and/or system administrator was previously authenticated when logging into user computing device 510 and/or accessing private network 550, local computing platform 520 may not need to authenticate the user and/or system administrator of user computing device 510. Regardless of whether or not the user and/or system administrator is previously authenticated and/or authenticated by local computing platform 520, user authentication engine 524c may store further computer-executable instructions which may cause local computing platform 520 to assess access permissions relating to the user and/or system administrator of user computing device 510 based on the username and password to determine whether or not the user and/or system administrator has permission to upload objects for customer sensitive name concealment.

At step 603, local computing platform 520 may provide an access interface to user computing device 510. In particular, processors 521 of local computing platform 520 may execute one or more instructions of object handler engine 524d which may cause local computing platform 520 to provide an access interface to user computing device 510 in response to authenticating a user and/or system administrator of user computing device 510 and/or identifying that the user and/or system administrator has permission to receive the access interface and ultimately upload an object for the concealment of customer sensitive data in virtual computing arrangements.

The access interface provided to user computing device 510 by local computing platform 520 may include an interface through which a user and/or system administrator of user computing device 510 can upload objects associated with customer sensitive names for object name hashing and/or encryption. Additionally, through the access interface, a user and/or system administrator of user computing device 510 may be able to specify an encryption and/or security level associated with the customer sensitive object name. As stated above, if a user and/or system administrator specifies that a customer sensitive object name requires a high level of security, local computing platform 520 may execute one or more stringent hashing algorithms and/or methods, and/or one or more encryption algorithms and/or methods to hash and/or encrypt the object name to a high level of security. Similarly, if a user and/or system administrator specifies that a customer sensitive object name requires a low level of security, local computing platform 520 may execute one or more basic hashing algorithms and/or methods, and/or encryption algorithms and/or methods to hash and/or encrypt the object name to a low level of security.

At step 604, a user and/or system administrator may upload an object such as a program and/or application associated with a customer sensitive name through the access interface and user computing device 510 may provide the object to local computing platform 520. As stated above, the object may include an application and/or program and may include an application and/or program name which includes customer sensitive data. In some instances, the user and/or system administrator may be able to upload a plurality of objects through the access interface for user computing device 510 to provide to local computing platform 520. Each of the plurality of uploaded objects may be associated a unique name and at least one of the plurality of objects may be identified by the user and/or system administrator of user computing device 510 as a secure object. Additionally, a user and/or system administrator may specify an encryption and/or security level associated with the customer sensitive object name with the upload of the object to local computing platform 520. The execution of one or more instructions of object handler engine 524d may cause local computing platform 520 to receive the objects and encryption and/or security level indication provided by the user and/or system administrator of user computing device 510.

Referring to FIG. 6B, at step 605, local computing platform 520 may extract the object name from the object provided by the user and/or system administrator through user computing device 510 at step 604. In particular, processors 521 of local computing platform 520 may execute one or more instructions of object handler engine 524d which may cause local computing platform 520 to extract the object name comprising customer sensitive data from the object provided by user computing device 510.

At step 606, local computing platform 520 may conceal the customer sensitive object name through one or more hashing and/or encryption operations. In particular, object encryption/decryption engine 524e may cause local computing device to execute one or more hashing and/or encryption algorithms and/or methods to hash and/or encrypt the object name for presentation in a concealed state at virtual computing platform 530 in external network 540. For example, object encryption/decryption engine 524e may cause local computing platform 520 to execute one or more hashing functions, utilize one or more private/public key pairs and/or algorithms, and/or execute one or more other encryption methods and/or algorithms to hash and/or encrypt (e.g., conceal) the customer sensitive object name.

In instances in which a user and/or system administrator of user computing device 510 specified an encryption and/or security level for the customer sensitive object name, local computing platform 520 may implement encryption measures corresponding to the specified encryption and/or security level. For example, if a user and/or system administrator specified that a customer sensitive object name requires a high level of security, object encryption/decryption engine 524e may cause local computing platform 520 to hash and/or encrypt the object name through execution of a combination of one or more hashing functions, one or more private/public key pairs and/or algorithms, and/or other encryption methods and/or algorithms. If a user and/or system administrator specified that a customer sensitive object name requires a low level of security, object encryption/decryption engine 524e may cause local computing platform 520 to hash and/or encrypt the object name through execution of at least one of one or more hashing functions, one or more private/public key pairs and/or algorithms, and/or other encryption methods and/or algorithms.

In instances in which the user and/or system administrator uploaded a plurality of objects through the access interface, local computing platform 520 may identify at least one of the plurality of objects specified by the user and/or system administrator as being a secure object. Based on the identification of the secure object, local computing platform 520 may conceal the unique object name of the secure object to create a concealed object name identifying the secure object through execution of one or more of the hashing and/or encryption processes described herein.

At step 607, local computing platform 520 may store the concealment details of corresponding to the hashing and/or encryption methods used to hash and/or encrypt the customer sensitive object name. In particular, local computing platform 520 may store one or more hash mappings associating the customer sensitive object name with the generated hashes in hash mapping and key database 524b. Additionally, local computing platform 520 may store one or more public/private key pairs used to encrypt the customer sensitive object name in hash mapping and key database 524b.

At step 608, local computing platform 520 may transmit the concealed customer sensitive object name to user computing device 510 and virtual computing platform 530. In some instances, however, local computing platform 520 may only transmit the hashed and/or encrypted object name to user computing device 510, which may subsequently transmit the hashed and/or encrypted object name to virtual computing platform 530. Additionally, local computing platform 520 may transmit the decoding and/or decryption information for decoding and/or decrypting the hashed and/or encrypted object name to user computing device 510. The decoding and/or decryption information may include the private key of a public/private key pair used in certain encryption circumstances and/or a mapping associating the hashed value of the hashed customer sensitive object name and the decoded object name.

Figure 6C:
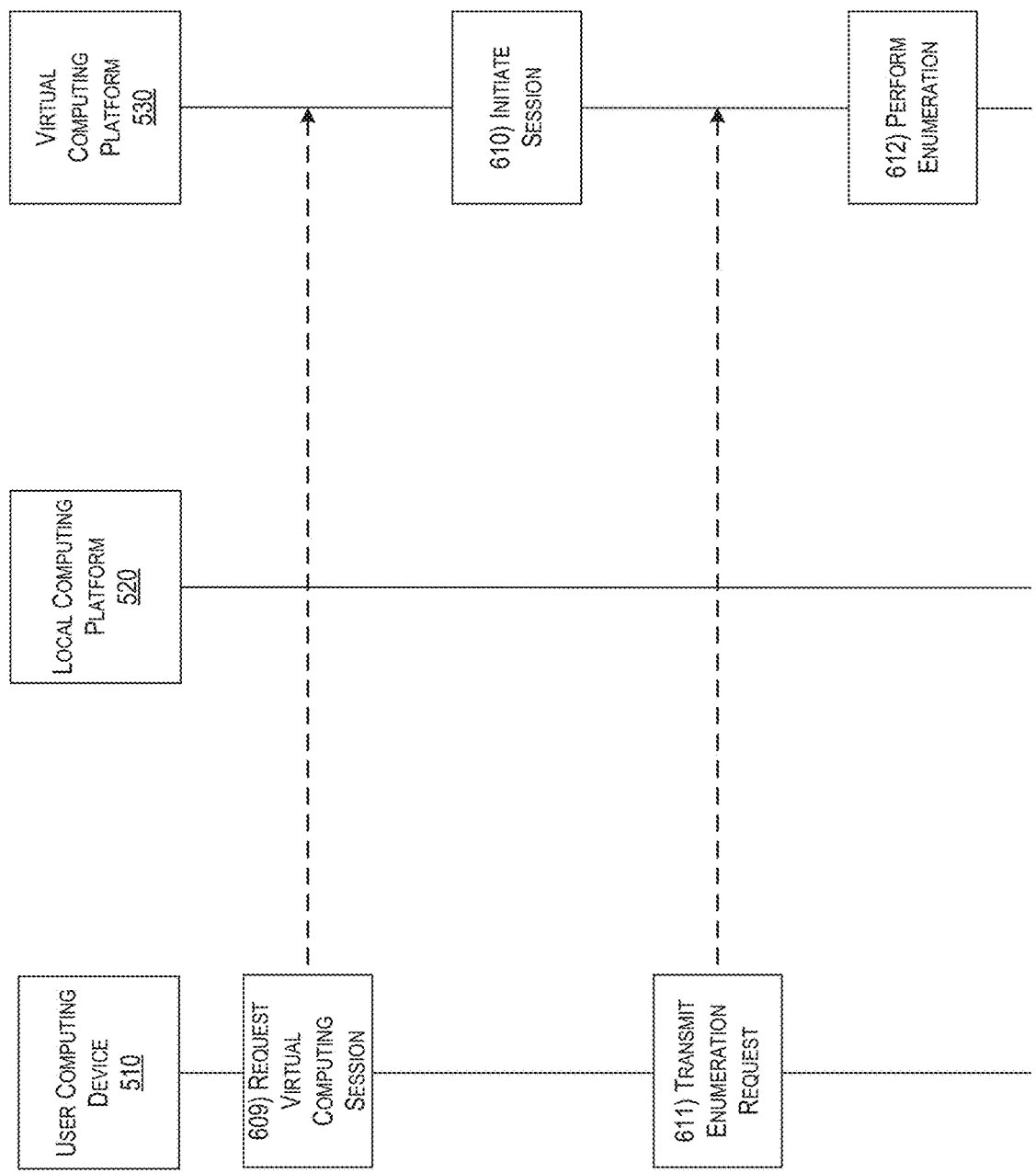

Referring to FIG. 6C, at step 609, user computing device 510 may request a virtual computing session from virtual computing platform 530. In some instances, the request may be associated with a new virtual computing session or an active virtual computing session. Additionally, the request may include login information (e.g., username and password) of a user and/or system administrator of user computing device 510 for accessing virtual computing platform 530.

In some instances, other user computing devices related to private network 550 and local computing platform 520 may request a virtual computing session from virtual computing platform 530. For example, another user computing device associated with a colleague of the user and/or system administrator of user computing device 510 may request a virtual computing session from virtual computing platform 530. In this way, the concealment processes described herein may be performed in relation to a particular entity such as an enterprise, organization, and/or company and customer sensitive object names may be concealed for the particular entity in relation to virtual computing platform 530 and/or other virtual and/or cloud computing platforms.

At step 610, virtual computing platform 530 may initiate the virtual computing session requested by user computing device 510 at step 609. In particular, virtual computing platform 530 may authenticate the user and/or system administrator of user computing device 510 based on the login information provided in the virtual computing session request. If the user and/or system administrator authenticated by virtual computing platform 530 is associated with an active virtual computing session, then virtual computing platform 530 may provide access to the active virtual computing session to user computing device 510. Alternatively, if the user and/or system administrator authenticated by virtual computing platform 530 is not associated with an active virtual computing session, then virtual computing platform 530 may create a virtual computing session for the user and/or system administrator and provide access to the virtual computing session to user computing device 510.

At step 611, user computing device 510 may transmit an enumeration request to virtual computing platform 530. The enumeration request provided by user computing device 510 may serve to query virtual computing platform 530 regarding the available objects, applications, and/or programs available to the user and/or system administrator of user computing device 510 in the virtual computing session.

At step 612, virtual computing platform 530 may perform the enumeration of available objects, applications, and/or programs available to the user and/or system administrator of user computing device 510 in the virtual computing session based on the enumeration request. In some instances, the enumeration performed by virtual computing platform 530 may return names of available objects, applications, and/or programs in a hashed and/or encrypted state, decoded and/or decrypted state, and/or combination thereof. Additionally, the enumeration performed by virtual computing platform 530 may return the hashed and/or encrypted customer sensitive object name transmitted to virtual computing platform 530 by local computing platform 520 and/or user computing device 510 at step 608.

Referring to FIG. 6D, at step 613, virtual computing platform 530 may transmit the enumeration of available objects, applications, and/or programs to user computing device 510. In some instances, virtual computing platform 530 may also transmit the enumeration of available objects, applications, and/or programs to local computing platform 520. The transmitted enumeration may include the names of available objects, applications, and/or programs available to the user and/or system administrator of user computing device 510 in a hashed and/or encrypted state, decoded and/or decrypted state, and/or combination thereof. In some instances, the transmitted enumeration may also return the hashed and/or encrypted customer sensitive object name transmitted to virtual computing platform 530 by local computing platform 520 and/or user computing device 510 at step 608.

At step 614, user computing device 510 may transmit one or more concealed object names to local computing platform 520 for decoding and/or decryption. At least one of the one or more concealed object names transmitted to local computing platform 520 may include the customer sensitive object name concealed by local computing platform 520 at step 606. In instances in which local computing platform 520 provided user computing device 510 with the hash mapping information and/or public/private key pair for decoding and/or decryption of the concealed customer sensitive object name, user computing device 510 may perform the decoding and/or decryption locally rather than requesting performance of such functions from local computing platform 520.

At step 615, local computing platform 520 may perform one or more decoding and/or decryption operations to produce the customer sensitive object name in a decoded and/or decrypted form (e.g., unconcealed form). In particular, processors 521 of local computing platform 520 may execute one or more instructions of object encryption/decryption engine 524e which may cause local computing platform 520 to decode and/or decrypt customer sensitive object names provided by user computing device 510. In particular, object encryption/decryption engine 524e may cause local computing platform 520 to execute one or more decryption methods corresponding to the private/public key pairs used to encrypt the customer sensitive object name. Furthermore, object encryption/decryption engine 524e may store further instructions which cause local computing platform 520 to access hash mappings of customer sensitive object names and resultant hashes of the customer sensitive object names in hash mapping and key database 524b to decode hashes of the customer sensitive object names.

In instances in which a high level of encryption and/or security was specified by the user and/or system administrator of user computing device 510, local computing platform may perform a plurality of the decoding and/or decryption processes described herein. For example, in the event that the customer sensitive object name was both encrypted and hashed, local computing platform 520 may perform both decryption and decoding operations to generate the customer sensitive object name in an unconcealed form. Similarly, in instances in which a low level of encryption and/or security was specified by the user and/or system administrator of user computing device 510, local computing platform may perform one or more of the decoding and/or decryption process described herein. For example, local computing platform 520 may perform one or more decryption and/or decoding operations to generate the customer sensitive object name in an unconcealed form.

At step 616, local computing platform 520 may return unconcealed customer sensitive object names to user computing device 510. In particular, processors 521 of local computing platform 520 may execute one or more instructions of object handler engine 524d which may cause local computing platform to transmit the unconcealed customer sensitive object names to user computing device 510.

Referring to FIG. 6E, at step 617, user computing device 510 may request execution of an object including a customer sensitive object name by virtual computing platform 530. The request for execution may include the hashed and/or encrypted object name in order to maintain the concealment of the customer sensitive object name from virtual computing platform 530. In some instances, the execution request may be provided through the virtual computing session linking user computing device 510 and virtual computing platform 530.

At step 618, virtual computing platform 530 may transmit execution instructions to local computing platform 520 based on the execution request provided by the user at step 617. Such may be the case in instances in which the object requested for execution is stored on local computing platform 520 as opposed to virtual computing platform 530. In some instances, the execution instructions may be related to the concealed object name.

At step 619, local computing platform 520 may execute the object based on the execution instructions provided by virtual computing platform 530. In order to do so, local computing platform may identify the decoded and/or decrypted customer sensitive object name through performance of one or more decoding and/or decryption operations detailed herein. At step 620, local computing platform 520 may return data responsive to executing the object to user computing device 510.

Figure 7:
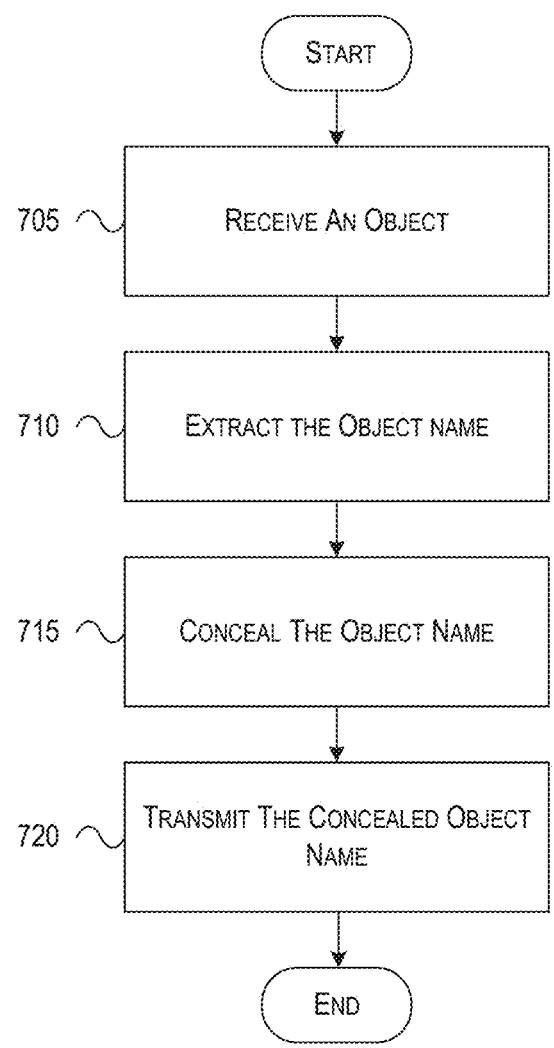
FIG. 7 depicts an illustrative method for the concealment of customer sensitive data in virtual computing arrangements in accordance with one or more illustrative aspects described herein.

FIG. 7 depicts an illustrative method for the concealment of customer sensitive data in virtual computing arrangements in accordance with one or more illustrative aspects described herein. Referring to FIG. 7, at step 705, a computing platform may receive an object including an object name from a user computing device. At step 710, the computing platform may extract the object name associated with the object. At step 715, the computing platform may conceal the object name to create a concealed object name identifying the object. At step 720, the computing platform may transmit the concealed object name to the user computing device and to a virtual computing platform.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:
1. A method, comprising:
receiving at a computing platform, from a user computing device having a same first domain as the computing platform, an object including an object name;
extracting the object name associated with the object;
concealing, using an encryption key, the object name to create a concealed object name identifying the object for presentation on a virtual computing platform operating on a second domain external from the first domain;
transmitting the encryption key to the user computing device; and transmitting the concealed object name to the virtual computing platform.

2. The method of claim 1, further comprising:
responsive to an enumeration request provided by the user computing device to the virtual computing platform, receiving the concealed object name during a virtual computing instance between the user computing device and the virtual computing platform;
processing the concealed object name to reveal the object name of the object; and
providing the object name to the user computing device.

3. The method of claim 1, further comprising:
prior to receiving the object from the user computing device, receiving an access request from the user computing device; and
authenticating a user of the user computing device.

4. The method of claim 1, wherein transmitting the encryption key to the user computing device is responsive to concealing the object name.

5. The method of claim 1, wherein concealing the object name involves the usage of one or more hashing operations.

6. The method of claim 1, further comprising:
receiving, from the user computing device, a plurality of objects each associated with unique object names, wherein at least one of the plurality of objects is identified as being a secure object; and
based on identification of the secure object, concealing the unique object name of the secure object to create a concealed object name identifying the secure object.

7. An apparatus, comprising:
a processor; and
a memory storing computer-readable instructions that, when executed by the processor, cause the apparatus to:
receive, from a user computing device having a same first domain as the apparatus, an object including an object name;
extract the object name associated with the object;
conceal, using an encryption key, the object name to create a concealed object name identifying the object for presentation on a virtual computing platform operating on a second domain external from the first domain;
transmit the encryption key to the user computing device; and
transmit the concealed object name to the virtual computing platform.

8. The apparatus of claim 7, wherein the memory stores further computer-readable instructions that, when executed by the processor, cause the apparatus to:
responsive to an enumeration request provided by the user computing device to the virtual computing platform, receive the concealed object name during a virtual computing instance between the user computing device and the virtual computing platform;
process the concealed object name to reveal the object name of the object; and
provide the object name to the user computing device.

9. The apparatus of claim 7, wherein the memory stores further computer-readable instructions that, when executed by the processor, cause the apparatus to:
prior to receiving the object from the user computing device, receive an access request from the user computing device; and
authenticate a user of the user computing device.

10. The apparatus of claim 7, wherein transmitting the encryption key to the user computing device is responsive to concealing the object name, transmit the encryption key to the user computing device.

11. The apparatus of claim 7, wherein concealing the object name involves the usage of one or more hashing operations.

12. The apparatus of claim 7, wherein the memory stores further computer-readable instructions that, when executed by the processor, cause the apparatus to:
receive, from the user computing device, a plurality of objects each associated with unique object names, wherein at least one of the plurality of objects is identified as being a secure object; and
based on identification of the secure object, conceal the unique object name of the secure object to create a concealed object name identifying the secure object.

13. One or more non-transitory computer-readable media storing instructions that, when executed by a computing platform comprising at least one processor and memory, cause the computing platform to:
receive, from a user computing device having a same first domain as the computing platform, an object including an object name;
extract the object name associated with the object;
conceal, using an encryption key, the object name to create a concealed object name identifying the object for presentation on a virtual computing platform operating on a second domain external from the first domain;
transmit the encryption key to the user computing device; and
transmit the concealed object name to the virtual computing platform.

14. The one or more non-transitory computer-readable media of claim 13 storing further instructions that, when executed by the computing platform comprising at least the one processor and the memory, cause the computing platform to:
responsive to an enumeration request provided by the user computing device to the virtual computing platform, receive the concealed object name during a virtual computing instance between the user computing device and the virtual computing platform;
process the concealed object name to reveal the object name of the object; and
provide the object name to the user computing device.

15. The one or more non-transitory computer-readable media of claim 13 storing further instructions that, when executed by the computing platform comprising at least the one processor and the memory, cause the computing platform to:
prior to receiving the object from the user computing device, receive an access request from the user computing device; and
authenticate a user of the user computing device.

16. The one or more non-transitory computer-readable media of claim 13, wherein concealing the object name involves the usage of one or more hashing operations.

17. The one or more non-transitory computer-readable media of claim 16, wherein transmitting the encryption key or a hash mapping to the user computing device is responsive to concealing the object name.

18. The one or more non-transitory computer-readable media of claim 13 storing further instructions that, when executed by the computing platform comprising at least the one processor and the memory, cause the computing platform to:
  receive, from the user computing device, a plurality of objects each associated with unique object names, wherein at least one of the plurality of objects is identified as being a secure object; and
  based on identification of the secure object, conceal the unique object name of the secure object to create a concealed object name identifying the secure object.

* * * * *